United States Patent [19]

Niederhofer

[11] Patent Number: 5,379,857

[45] Date of Patent: Jan. 10, 1995

[54] DRIVE CONFIGURATION FOR A WHEELED MACHINE

[75] Inventor: Kent J. Niederhofer, Naperville, Ill.

[73] Assignee: Caterpillar Inc., Peoria, Ill.

[21] Appl. No.: 90,866

[22] Filed: Jul. 13, 1993

[51] Int. Cl.$^6$ ............................................ B60K 17/348
[52] U.S. Cl. .................................... 180/248; 180/375; 180/376
[58] Field of Search ............... 180/233, 248, 344, 347, 180/374, 375, 376, 377, 379

[56] References Cited

U.S. PATENT DOCUMENTS

| | | | |
|---|---|---|---|
| 620,030 | 2/1899 | Hamilton | 180/233 X |
| 2,625,231 | 1/1953 | Martin | 180/248 X |
| 2,766,637 | 10/1956 | Bock | 180/248 X |
| 4,289,213 | 9/1981 | Seaman | 180/248 X |
| 4,666,015 | 5/1987 | Matsuda et al. | 180/233 |
| 4,723,623 | 2/1988 | Teraoka et al. | 180/233 |
| 4,804,060 | 2/1989 | Iritani | 180/233 |
| 4,856,611 | 8/1989 | Teraoka et al. | 180/233 |
| 5,038,885 | 8/1991 | Sato et al. | 180/248 X |
| 5,236,061 | 8/1993 | Haupt | 180/374 X |

FOREIGN PATENT DOCUMENTS 1334908 10/1973 United Kingdom ............... 180/379

Primary Examiner—Eric D. Culbreth
Assistant Examiner—F. Zeender
Attorney, Agent, or Firm—William C. Perry

[57] ABSTRACT

Construction equipment is often provided with the same size tires on both the front and the rear of the machine to maintain commonality of tire sizes and to simplify the drivetrain configuration. The present invention provides a smaller pair of tires on one end of a machine than the pair of tires that are positioned on the opposite end. In doing so, the overall height of the end of the machine having the smaller tires is reduced. This lowers the center of gravity of the machine to improve operating stability of the machine. In addition, the reduced height makes that portion of the vehicle more accessible and thereby enhances serviceability.

2 Claims, 1 Drawing Sheet

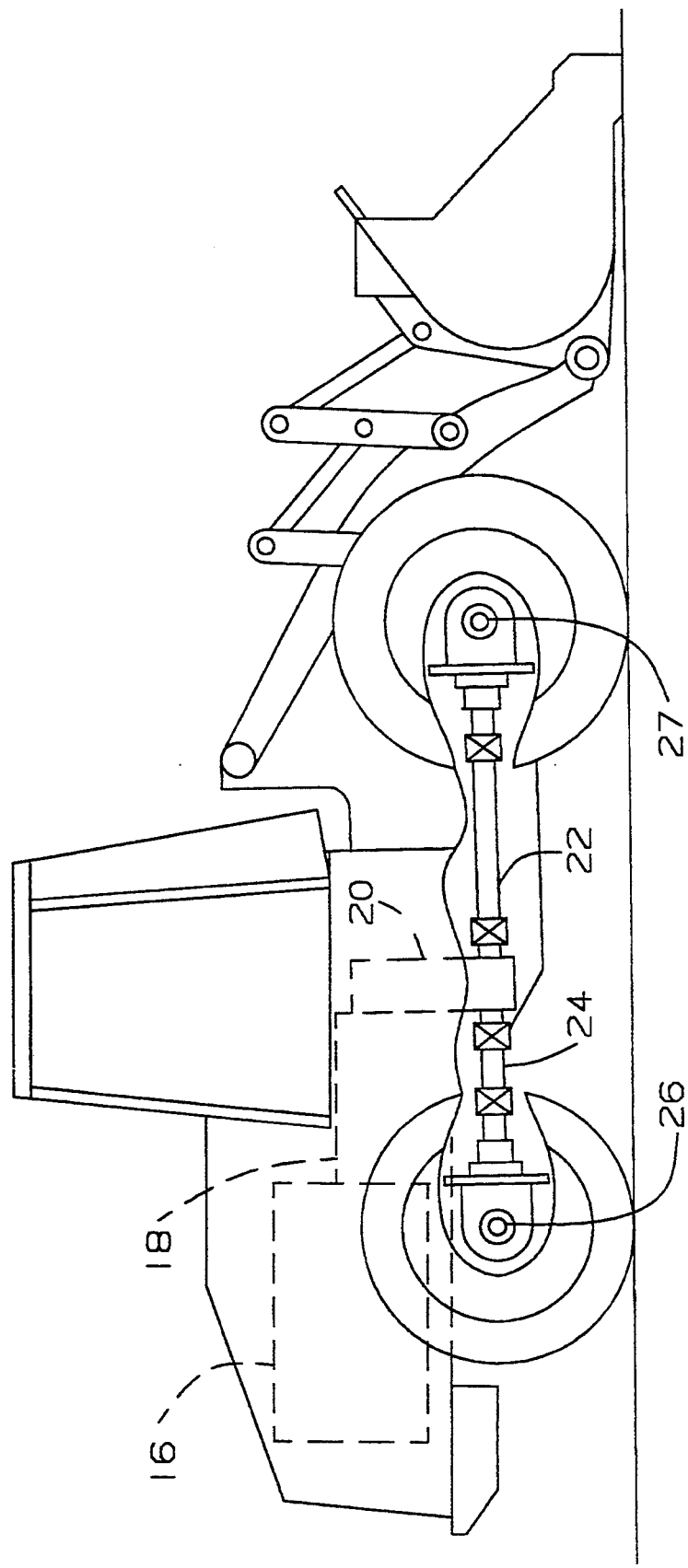

DRIVE CONFIGURATION FOR A WHEELED MACHINE

TECHNICAL FIELD

This invention pertains to a drive configuration for a wheeled machine and more particularly to a machine having differently sized, tires on the respective front and rear portions of machine.

BACKGROUND ART

In conventional construction vehicles such as wheel loaders, it is common practice to place the same size tire on both the front and the rear of the vehicle. While this has been known to work quite well in most instances, the tire size that is chosen for each individual vehicle is normally dictated by the functional requirements of the front tires. Since the 0 majority of the operational loads are carried by the front end of the vehicle, the functional requirements for the rear tires are not the same as those on the front. However, in order to maintain commonality of tire size between the front and rear of the vehicle the rear tires are usually much larger that would be required by normal working conditions. This situation results in an unnecessary increase in the height of the rear portion of the vehicle which in turn, increases the center of gravity of the vehicle and tends to hamper serviceability. The larger rear tire also tends to increase the wheelbase of the vehicle thus creating a larger turning radius.

In other instances, such as agricultural equipment, a set of wheels on one end of a vehicle may be of a different size with respect to the set of wheel on the other end of the vehicle. In these instances however, the driveline, which includes a pair of drive shafts, is "stepped" through the use of a drop box to lower the elevation of the the driveshaft that is connected to the axle that supports the smaller tires. In doing so, the drive shafts are maintained it in a generally horizontal orientation. This requires additional componentry to achieve the stepped configuration which unnecessarily adds to the expense and complexity of the driveline. In order to avoid this problem other arrangements have utilized a driveline which extends from the output portion of the engine to the axle at a rather steep angle. The angularity must be accommodated by U-joints that are specifically designed to operate in this condition. This type of U-joint is also extremely expensive and, even though it is specifically designed to accommodate this specific condition has also been known to be the source of frequent driveline failures.

The present invention is directed to overcoming one or more of the problems as set forth above.

DISCLOSURE OF THE INVENTION

In one aspect of the present invention a wheeled machine is provided with a frame that supports a first drive axle and a second drive axle in spaced relationship to one another. A first pair of tires is mounted on the first drive axle and have a first preselected size. A second pair of tires is mounted on the second drive axle and has a second preselected size that is smaller that of the first pair of tires to position the frame of the machine in a non-parallel relationship to a supporting surface of the machine.

In another aspect of the invention, a wheeled machine is provided with a frame that supports a first and a second drive axle. The first drive axle is sufficient for mounting a first pair of tires having a first preselected size, on each of an opposite end of the drive axle. The second drive axle is sufficient for mounting a second pair of tires having a second preselected size, on each of an opposite end of the second drive axle. A powertrain is supported by the frame and defines a drive output portion that is positioned between the first and second drive axles. A driveline extends between the drive output portion of the engine and each of the first and second axles to transmit driving rotation to each drive axle and is positioned at an angle with respect to a supporting surface of the machine.

With a tire configuration as described above, the overall height of one portion of a machine which in the present instance is the portion that supports the engine, may be lowered with respect to the other portion. In doing so, serviceability of the engine is substantially improved as is the operator's visibility in the direction of the engine. In addition, the center of gravity of the entire machine is also lowered which results in improved stability and operation of the vehicle.

BRIEF DESCRIPTION OF THE DRAWINGS

FIG. 1 is a diagrammatic, side view of a machine that embodies the principles of the present invention.

BEST MODE FOR CARRYING OUT THE INVENTION

Referring now to the drawing, a machine 10 is shown whose major components are supported by a primary frame 12. The machine is supported for movement along the ground or any suitable support surface by a pair of tire and axle assemblies 13 and 14 that are mounted to the respective front and rear portions 15 and 16 of the frame. A first drive axle 18 is mounted to the front portion 15 of the frame 12 while a second drive axle 20 is mounted to the rear portion 16 of the frame. A first pair of tires 22 (one shown) is mounted on opposite ends of the first drive axle 18 and a second pair of tires 24 (one shown) is mounted to opposite ends of the second drive axle 20. The first pair of tires has a first preselected size of approximately 835mm while the second pair of tires has a second preselected size of approximately 772mm. It is to be understood that both drive axles are maintained in the same relationship with respect to the frame such that the decrease in the rolling radius of the second pair of tires 24 will position the second drive axle 20 at a position that is elevationally lower than the first drive axle 18. This in turn, will cause the frame to be positioned at a slight angle with respect to the support surface.

The frame 12 further supports a powertrain 26 in a well known manner to provide driving rotation to each of the respective drive axles 18 and 20. The powertrain 26 includes an engine 28, a transmission 30 and a dropbox 32. The powertrain 26 defines an output portion 34 that extends below the level of the engine and is positioned between the first and second drive axles and is substantially aligned with both drive axles. A driveline 36 extends between the output portion 34 of the powertrain and a pair of differentials 38 and 40 on each of the respective first and second drive axles 18 and 20 in a manner that is well known in the art. Because of the difference in tire sizes between the respective drive axles, it is to be understood that each differential has an individual drive ratio to permit the machine to be driven without a "lag/lead" condition. The driveline includes a first drive shaft 42 that extends forward from the output portion to the differential 38 of the first drive axle and a second drive shaft 44 that extends rearwardly to the differential 40 of the second drive axle. The drive axles 18 and 20, the output portion 34 of the powertrain 26 and the driveline 36 are all positioned substantially on a common plane X which is maintained in generally parallel relationship to the frame 12.

INDUSTRIAL APPLICABILITY

Since the respective pairs of tires 22 and 24 are two different sizes, one end of the machine (the rear end in the present instance) will naturally be lower than the other. This, in turn, will cause the frame of the machine 10 to angle downwardly from front to rear (as viewed in the drawing). The lowering of the rear portion 16 of the frame 12 with respect to the front portion 15 provides several benefits. First of all, since the frame is lower on one end than it would be if both pairs of tires were the same size, it will naturally lower the center of gravity for the entire machine. This proves to be beneficial in the overall stability of the machine, especially when working on sideslopes. Secondly, when this tire configuration is utilized on a machine such as a wheel loader, the frame portion (in the present instance rear portion 16) that is lowered will be in the area of the powertrain. Since the height of frame on which the powertrain is supported is reduced, so too is the overall height of the powertrain itself. This results in improved serviceability for the components of the powertrain, especially the engine 28 and other components that require daily maintenance. Finally, with the reduction in height of the rear portion 16 of the machine, visibility in the rearward direction is substantially increased. This occurs because of the change in relationship between the height of the enclosure that surrounds the engine and the position of the cab mounted on the frame 12. Regulations that govern shipping heights of vehicles dictate the position of the cab with respect to the ground. Therefore, since the rear of the vehicle is lower due to the reduced rolling radius of the second pair of tires 24, the operator positioned within the cab will be higher with respect to the engine enclosure and thus his visibility will be improved.

The reduction in size between the respective first and second pairs of tires 22 and 24 also allows a reduction in the wheel base of a machine with respect to one having tires of identical size. This not only allows the machine to have a shorter turning radius, which will improve maneuverability, it also provides greater distance between the tires and the enclosure that surrounds the engine. This results in improved access to the powertrain components. As previously discussed, increased accessibility translates into improved serviceability which is very beneficial, especially when performing daily maintenance.

With the reduced height of one end portion of the machine it is critical to note that orientation of the driveline with respect to the frame remains substantially parallel as in a conventional vehicle. This places the frame 12 and the driveline 36 at an angle to the support surface over which the machine will traverse. Being so positioned, the driveline components remain aligned along a common plane. This alleviates the necessity to provide additional componentry in the powertrain to "step" the elevation of the components or to accommodate severe angularity between the points of rotation.

Other aspects, objects and advantages of this invention can be obtained from a study of the drawing, the disclosure and the appended claims.

I claim:

1. A wheel loader, comprising:
   a frame;
   a first drive axle supported by a front portion of the frame and being sufficient for mounting a first pair of tires on each of an opposite end thereof, said tires being of a first preselected diameter;
   a second drive axle supported by a rear portion of the frame and being sufficient for mounting a second pair of tires on each of an opposite end thereof, said second pair of tires being of a second preselected diameter smaller than that of the first pair of tires;
   a powertrain supported by the frame and having a drive output portion that is positioned between said first and second drive axles; and
   a driveline extending between the drive output portion of the powertrain and each of the first and second axles to transmit driving rotation therebetween, said driveline being positioned along a plane that extends between the longitudinal centerlines of the first and second drive axles and is positioned at an angle with respect to a horizontal plane, said angle being substantially parallel to the frame.

2. The machine as set forth in claim 1 wherein the first drive axle includes a first differential having a first preselected drive ratio to transmit rotation from the driveline to the first pair of tires and the second drive axle includes a second differential having a second preselected drive ratio to transmit rotation from the driveline to the second pair of tires.

* * * * *